April 21, 1970    JEAN-JACQUES CHARRIN ET AL    3,507,061
APPARATUS FOR BRINGING PULVERULENT SOLID MATERIALS INTO
CONTACT WITH GASEOUS MATERIALS
Filed Feb. 23, 1968      3 Sheets-Sheet 2

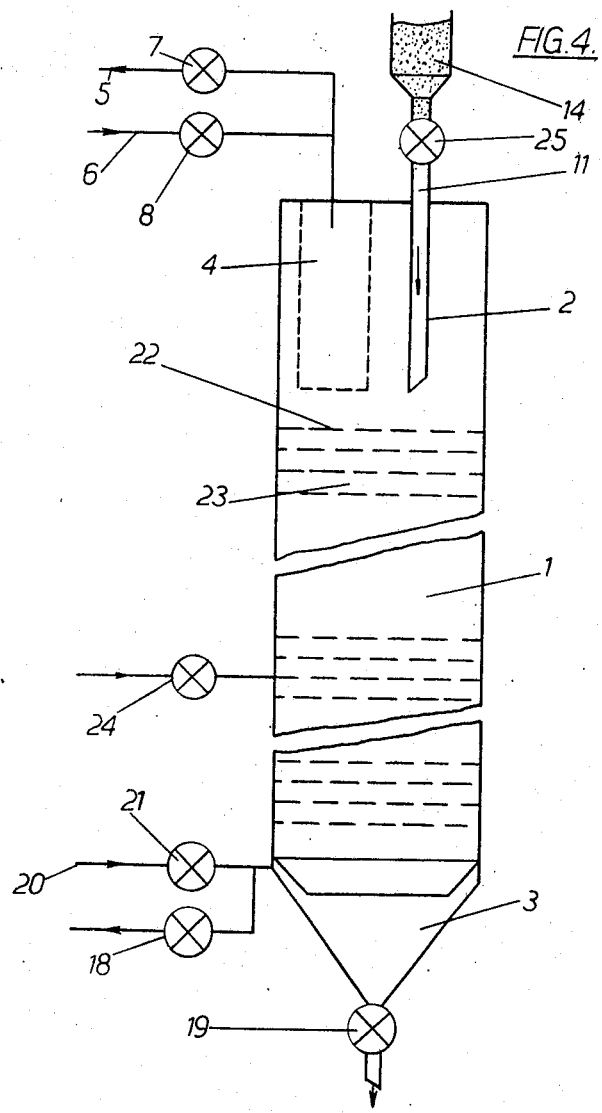

United States Patent Office 3,507,061
Patented Apr. 21, 1970

3,507,061
APPARATUS FOR BRINGING PULVERULENT SOLID MATERIALS INTO CONTACT WITH GASEOUS MATERIALS
Jean-Jacques Charrin, Lyon, and Pierre Joseph Frechet, Caluire, France, assignors to Rhone-Poulenc S.A., Paris, France, a French body corporate
Filed Feb. 23, 1968, Ser. No. 707,642
Claims priority, application France, Feb. 27, 1967, 96,683
Int. Cl. F26b 17/00
U.S. Cl. 34—171     5 Claims

ABSTRACT OF THE DISCLOSURE

The specification describes an apparatus for treating pulverulent solids with gases or vapors, in which the solid material is fed to the upper region of a chamber having a plurality of vertically spaced, apertured, horizontal baffles. Gas or vapor is passed up through the chamber to exit via a filter, and then a gas or vapor, e.g. an inert gas is fed via the filter to the lower end. This cycle may be repeated a number of times and the solids are then discharged through the lower end.

---

The present invention concerns an apparatus for bringing pulverulent solid material into contact with gaseous materials.

By "gaseous materials" is meant reactive or non-reactive products formed of a gas, a non-saturating vapour, a mixture of gases or a mixture of gases and vapours above the dewpoint.

It is known to bring solid materials into contact with gaseous materials, and this does not give rise to any particular difficulties as long as the solid particles are of sufficient dimensions. On the other hand, when the solid materials are in the form of very fine powder, many difficulties are encountered, and the "fluidised bed" technique is then generally used.

In this technique, the pulverulent materials are maintained in suspension by a rising current of gaseous material. The apparatus may be supplied with pulverulent solid materials at one point and the fluidised mass may be extracted at another point, whereafter the solid and gaseous materials may be separated.

Conventional apparatus for carrying out such operations permit good transfer of mass and heat between the solid and gaseous materials, it being possible for the apparatus to have a small useful volume, while the periods of treatment may be short.

However, when pulverous solid materials of very great fineness or of low apparent density are to be treated, the checking of the level of the fluidised bed and the isolation of solid material is a particularly delicate matter. Moreover, the necessary movement of the gases may entrain an appreciable proportion of the solid material and necessitate considerable separating devices. More particularly, separating devices of the "cyclone" type often do not operate well under these conditions and the filters must be bulky and, even then require frequent clearing, which may be harmful to the regular performance of the operations.

Moreover, despite the progress made, a considerable period of contact is often still required, whereby the productivity of the installation is limited.

According to one aspect of the present invention there is provided an apparatus for contacting pulverulent solid material with gaseous products, such apparatus including a substantially vertically extending treatment chamber, having a plurality of vertically spaced substantially horizontally extending apertured baffles in the central region thereof, means for feeding pulverulent solid material to the upper region of said chamber, means for supplying and withdrawing gas at the upper region of said chamber through a filter, means for supplying and withdrawing gaseous material at the lower region of said chamber and means for withdrawing pulverulent material from the lower region of said chamber.

The new apparatus ensure an intimate and prolonged contact between these products, facilitate their separation and are capable of regular operation.

In order that the invention may more readily be understood, the following description is given, merely by way of example, reference being made to the accompanying drawings, in which:

FIGURE 4 illustrates a modified construction of the apparatus.

Figure 1:
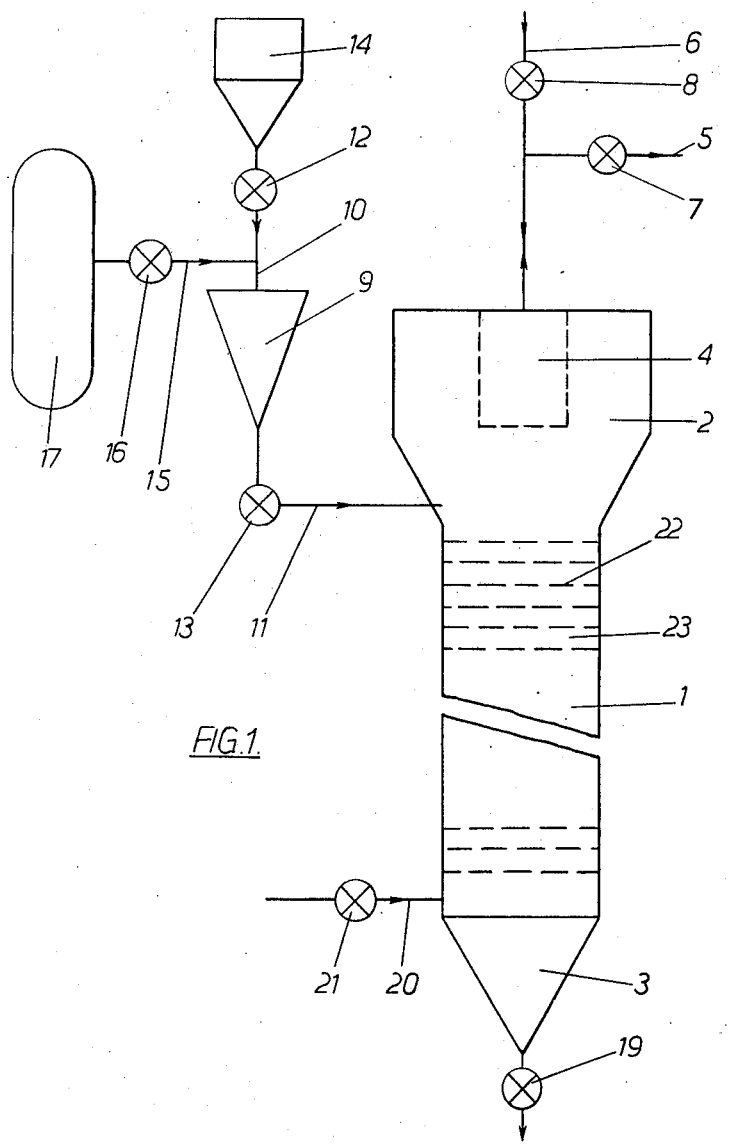
FIGURE 1 illustrates one embodiment of apparatus according to the invention with its most important accessories.

The apparatus illustrated in FIGURE 1 is composed of a chamber mounted with its axis vertical and having a central region 1 which is bounded by vertical side walls, an upper region 2 of larger cross-section and a lower downwardly convergent region 3. The upper region 2 is provided with a filter 4 or small surface, into which enter two pipes 5 and 6 provided with valves 7 and 8 for the delivery and introduction of the gases and vapours, and with a device for the cyclic introduction of pulverulent solids, which includes a lock-chamber 9.

Figure 2:
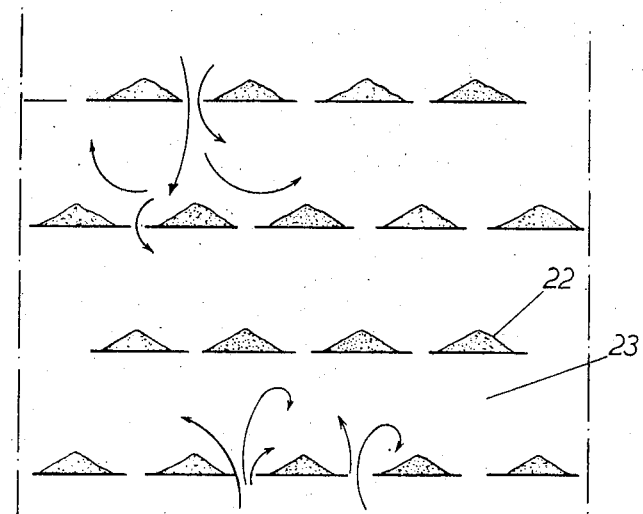
FIGURES 2 and 3 illustrate two particular forms of construction of the baffles.

The central region of the chamber 1 is provided with a large number of baffles defining turbulence zones in which the gases and vapours form eddies which limit the vertical displacement of the pulverulent solids. These baffles may consist, as shown in FIGURE 2, of a large number of fixed apertured plates which are vertically and regularly spaced. They define turbulence zones 23, each bounded by side walls and two successive plates. These plates are formed with regularly spaced holes, the diameter of which is more than ten times the diameter of the largest solid particles treated or agglomerates (to avoid any danger of clogging). The axes of the holes in the two successive plates are spaced and are staggered by an equal and uniform distance. The extent of perforation of the plates, i.e. the ratio of apertured surface to the total surface of the plate, is between 2% and 50%, and preferably between 4% and 25%. The gap between two plates is between 0.5 and 2 times the minimum inter-axial distance of two neighbouring holes in the same plate. The number of plates is larger in proportion as the homogeneity aimed at is greater and the desired contact period is longer, but it is limited by the acceptable pressure losses of the gases and the acceptable cost of construction.

Preferably, on the outside of the outer walls of the apparatus heating or cooling means (not shown) are provided, for example a double jacket provided with lateral pipes, or appropriate electrical resistors for maintaining an appropriate temperature within the treatment chamber.

The lower region 3 has in its lower end an orifice provided with a valve 19. A pipe 20 provided with a valve 21 permits the supply of gaseous material and leads into the apparatus below the plates.

In order to facilitate the flow of the pulverulent charges before and after treatment, the valves 12, 13 and 19 are preferably designed to afford a direct passage of large cross-sectional area. The opening and closing of each valve is effected by any mechanical, electrical or pneumatic means, at precise instants, in accordance with a pre-set programme.

The pulverulent materials are supplied from a reservoir

14. The valves 16 and 13 being closed, the valve 12 is opened to fill the lock-chamber 9.

With the valve 12 closed, a gas inert to the solid material, for example nitrogen, which is maintained under pressure in the reservoir 17, enters the lock-chamber by way of the pipe 15 immediately the valve 16 is opened and, with the valve 13 open, it forces the material through the ducts 11 into the upper region 2 of the apparatus. The valves 16 and 13 are then closed and the valve 12 opened to fill the lock-chamber for the succeeding cycle.

For the treatment, the charges are cyclically introduced into the interior of the apparatus and the gaseous products, which are optionally first brought to an appropriate temperature, are pulsed in identical cycles comprising at least two phases. In a first phase, the solid charges are introduced by opening of the valve 13, which is then immediately closed. At the same time, reactive or non-reactive gaseous materials are introduced by opening of the valve 21, and effect an upward flushing of the apparatus to permit the escape of these gaseous materials by opening of the valve 7. In a second phase, the valves 7 and 21 are closed and the valves 8 and 19 are simultaneously opened, whereby a downward flushing is effected in the apparatus by gaseous materials, which pass out through the valve 19. It is generally appropriate for the speeds at which the gaseous products pass through the perforations in the plates to be between 1 and 10 times the speed of sedimentation.

A further identical cycle is then commenced. The cycles are so adjusted that the solid material is constantly maintained in suspension and the gaseous materials reach at least the opposite end of the apparatus into which they are introduced. The cycles normally have a duration between 5 seconds and 20 minutes, and preferably between 20 seconds and 8 minutes.

During the course of these cycles the solid material steadily progresses downwardly through the apparatus and is eventually discharged through the valve 19.

The apparatus according to the invention has many advantages. The number of turbulence zones, the extent of perforation of the plates bounding them, and the speeds at which the gases pass through the orifices may be so chosen as to obtain an optimum contact time.

The frequent reversals of the direction of flow of the vapours and of the gases increase the turbulences in each contact zone, thereby creating excellent exchange conditions. The vapours and the gases, the pressure of which is alternatively exerted on each face of the plates, would immediately clear the holes in the plates if that were necessary. Finally, the filter is cleared by means of a flow of gas at a frequency higher than might be necessary, which guarantees that it remains in a perfect state of operation at all times.

Owing to the low extent of perforation of the plates and the speeds of the gases passing through the orifices in the plates, the speeds of the gaseous materials in the upper region 2 remain low. The entrainment of the solid materials by the gases in the upper region is therefore limited and the filter may without disadvantage be of very small surface and volume. In the lower region 3, the delivery of the solid products takes place by gravity and it is facilitated by the current of delivered gases.

Figure 3:
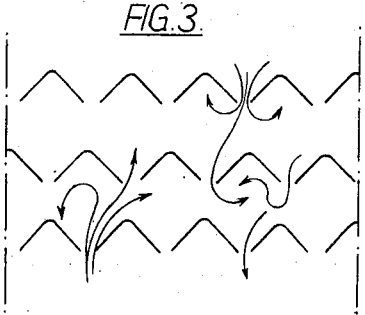

Many technological variants may be applied to the apparatus as described. For example, the perforated plates forming the turbulence zones in the central region 1 of the apparatus may be replaced by horizontal or inclined, corrugated or goffered, baffles or by obstacles such as angle irons or section irons disposed in staggered parallel relationship, illustrated by way of example in FIGURE 3, which afford a small cross-sectional area for throughflow to the gaseous material and limit the vertical displacements of the charges, while causing a small loss of pressure.

The central zone of the apparatus preferably has vertical side walls and a circular horizontal cross-section. However, the side walls may also be frustoconical over one or more sections or over their entire height, and the horizontal cross-sections may also be polygonal, elliptical, etc. The upper region 2 of the apparatus is preferably widened as illustrated, in relation to the central region 1 in order to reduce the speed of the gaseous materials in the vicinity of the filter below the speed of sedimentation of the charges. Excessive entrainment of solid particles is thereby avoided. The lower region 3 may be designed to facilitate the separation of the solids and the gases, for example by the addition of a collar and of a special gas delivery device 18 (see FIGURE 4).

The pipes for the admission and delivery of the gases may be single as described with reference to FIGURE 1, but according to requirements, the apparatus may comprise multiple pipes or even have additional pipes at other points (see FIGURE 4).

The system for the introduction of the solid products through a lock-chamber as described and as illustrated in FIGURE 1 may be replaced by by a reservoir having a rotary distributor as illustrated in FIGURE 4 or by other conventional systems such as worms.

Other variants will be readily apparent to the person skilled in the art, but it is essential to retain the characteristics afforded by the turbulence zones, the speeds of flow of the gases through the orifices in the plates and the cyclic reversal of the direction of flow of the gaseous products in the turbulence zones. If desired, the turbulence zones may be separate or combined in groups or they may preferably form stacks as stated. Some of the turbulence zones may form an active part of the apparatus and the upper part may be reserved for other operations and the lower part employed for other purposes such as additional treatments.

The described apparatus makes it possible to bring about an intimate contact between a solid product having characteristics such that it may be moved by a current of gas (i.e. in practice a powdered product which does not spontaneously agglomerate under the operating conditions) and a reactive or non-reactive gaseous medium (this medium being formed of a gas, a non-saturating vapour, a gas mixture or a mixture of gases and vapours below its dewpoint). Such an apparatus may receive many applications.

The apparatus is obviously especially advantageous when it is desired to treat very fine solid products, solid products which are difficult to separate from the gaseous medium, and solid and gaseous products requiring a considerable period of contact. It is obviously impossible to enumerate in detail all the applications of the apparatus according to the invention, but by way of information the following may be mentioned without limiting the invention:

The heating of pulverulent solid materials by means of a gas and more generally the production of effective heat exchanges, which are often difficult to obtain in known apparatus, between pulverulent materials and gaseous products; the drying of pulverulent materials in contact with hot gases; the treatment of pulverulent materials in contact with gaseous materials, for example their conversion by various chemical reactions such as oxidation, reduction, halogenation, etc.; the conversion, by chemical reaction, of gaseous materials brought into contact with pulverulent materials performing the function of a catalyst, etc.

Thus, it may be advantageous to employ the apparatus according to the invention wherever it is desired to effect heat exchanges and/or exchanges of material between gaseous and pulverulent solid materials.

The following example illustrates the invention without limiting it.

EXAMPLE

An apparatus as illustrated in FIGURE 1 formed of stainless-steel is employed, which consists of a column having a vertical axis, of which the central region, having a diameter of 100 mm. and a height of 1250 mm., is composed of 24 turbulence chambers separated by 25 baffles. The latter consist of horizontal discs fitted inside the column and each formed with holes of a diameter of 12 mm., which are distributed on the corners of a square having sides of 43 mm., concentric to the disc, the holes in successive discs being equally staggered. These discs have an extent of perforation of 5.7% and are maintained 50 mm. apart by distance pieces. At the top, the diameter of the column is increased to 124 mm., and there is disposed therein a filter of porous stainless steel having a porosity of 10$\mu$ and a surface of 5.7 dm.$^2$, and a device for the introduction of solid materials, composed of a spherical glass lock-chamber having a useful volume of 525 cc., bounded by two rubber sleeve valves having an orifice of 40 mm., which is connected to a source of nitrogen under a pressure of 0.2 atmosphere. The base of the column is conical, the angle of the cone is 60°, and there is secured to the apex thereof a cock having a spherical plug having an orifice of 20 mm. The various valves are automatic and are pneumatically controlled by means of a clockwork movement provided with a cam device.

This apparatus is suitable, for example, for drying operations. Damp pulverulent polyvinyl acetate/chloride, having a particle size between 0.05 and 1 mm. and containing 16.2% by weight of water, is introduced into the apparatus at the rate of 1.7 kg. per hour, while dry nitrogen is introduced at a temperature of 90° centigrade at a rate of 3 cubic metres per hour (measured at normal temperature and pressure). The damp powder is subjected successively to a rising current of nitrogen for 242 seconds and then to a descending current for 16 seconds. The duration of each cycle is therefore 258 seconds, and the temperature in the interior of the apparatus becomes stabilised at 60° centigrade. Under these conditions, the moisture content of the product withdrawn from the apparatus is reduced from 16.2 to 4.9%, with a consumption of 1.75 cubic metres of nitrogen by kilogram of polymer (measured at standard temperature and pressure).

If the same polymer is dried discontinuously in a stove, the time necessary to obtain the same moisture content is 20 minutes. By "instantaneous" drying of the standard kind, a polymer having a moisture content of 3.6% is obtained, but the consumption of nitrogen is as high as 6.6 cubic metres (measured at standard temperature and pressure) of nitrogen by kilogram of polymer.

We claim:
1. Apparatus for contacting pulverulent solid material with gaseous products, said apparatus including, in combination:
   (a) a substantially vertically extending treatment chamber;
   (b) an upper, a central and a lower region to said chamber;
   (c) a plurality of vertically spaced substantially horizontally extending baffles in the central region of said chamber;
   (d) means defining orifices in each of said baffles;
   (e) means for feeding pulverulent solid material to the upper region of said chamber;
   (f) a filter located in the upper region of said chamber;
   (g) means for supplying and withdrawing gaseous materials at the upper region of said chamber through said filter;
   (h) means for supplying and withdrawing gaseous material at the lower region of said chamber; and
   (i) means for withdrawing pulverulent material from the lower region of said chamber.

2. The apparatus defined in claim 1, wherein the axes of the orifices of a baffle are offset with respect to the axes of the orifices of an adjacent baffle.

3. The apparatus defined in claim 2, wherein the spacing between adjacent baffles is between 0.5 and 2 times the minimum inter-axial distance between two neighbouring orifices in a baffle.

4. The apparatus defined in claim 1, wherein the total area of the orifices in a given baffle is between 2% and 50% of the total area of said baffle.

5. The apparatus defined in claim 4, wherein the total area of the orifices in a given baffle is between 4% and 25% of the total area of said baffle.

References Cited
UNITED STATES PATENTS

| | | |
|---|---|---|
| 2,702,434 | 2/1955 | Richardson et al. |
| 2,777,760 | 1/1957 | Dineen et al. |
| 2,892,510 | 6/1959 | Wygant _____ 55—341 XR |
| 3,052,990 | 9/1962 | Tailor. |

CHARLES J. MYHRE, Primary Examiner

H. B. RAMEY, Assistant Examiner